United States Patent
Kim et al.

(10) Patent No.: US 11,709,294 B2
(45) Date of Patent: Jul. 25, 2023

(54) OPTICAL LAMINATE

(71) Applicant: LG CHEM, LTD., Seoul (KR)

(72) Inventors: Ha Neul Kim, Daejeon (KR); Eun Seon Lee, Daejeon (KR); Seungil Baek, Daejeon (KR); Se Jeong Kim, Daejeon (KR); Woo Han Kim, Daejeon (KR); Yeongkyu Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 325 days.

(21) Appl. No.: 17/101,967

(22) Filed: Nov. 23, 2020

(65) Prior Publication Data
US 2021/0072427 A1    Mar. 11, 2021

Related U.S. Application Data

(63) Continuation of application No. PCT/KR2020/000613, filed on Jan. 13, 2020.

(30) Foreign Application Priority Data

Jan. 14, 2019    (KR) .......................... 10-2019-0004839

(51) Int. Cl.
*G02B 1/14* (2015.01)
*G02B 1/18* (2015.01)
(Continued)

(52) U.S. Cl.
CPC ................. *G02B 1/14* (2015.01); *C09D 5/00* (2013.01); *C09D 5/002* (2013.01); *C09D 127/18* (2013.01); *C09D 133/062* (2013.01); *C09D 183/06* (2013.01); *G02B 1/18* (2015.01); *G02B 5/305* (2013.01)

(58) Field of Classification Search
CPC . G02B 1/14; G02B 1/18; G02B 5/30–5/3091; C09D 5/1668; C09D 5/1675
See application file for complete search history.

(56) References Cited

U.S. PATENT DOCUMENTS

| 9,403,991 B2 | 8/2016 | Kang et al. |
| 9,567,479 B2 | 2/2017 | Kang et al. |
| (Continued) | | |

FOREIGN PATENT DOCUMENTS

| CN | 1639588 A | 7/2005 |
| CN | 101456947 A | 6/2009 |
| (Continued) | | |

OTHER PUBLICATIONS

International Search Report issued for International Application No. PCT/KR2020/000613 dated Apr. 29, 2020, 4 pages.

*Primary Examiner* — Prashant J Khatri
(74) *Attorney, Agent, or Firm* — Rothwell, Figg, Ernst & Manbeck, P.C.

(57) ABSTRACT

The present disclosure provides an optical laminate which exhibits improved adhesive strength and scratch resistance together with excellent hardness and fingerprint resistance properties, by further including a fingerprint-resistant layer including an organosilane having excellent adhesion strength with the hard coating layer and an anti-fouling function on the hard coating layer including the transparent support substrate layer and the hard coating layer.

14 Claims, 1 Drawing Sheet

(51) Int. Cl.
*C09D 5/00* (2006.01)
*C09D 127/18* (2006.01)
*C09D 133/06* (2006.01)
*C09D 183/06* (2006.01)
*G02B 5/30* (2006.01)

(56) References Cited

U.S. PATENT DOCUMENTS

| | | | |
|---|---|---|---|
| 9,701,862 B2 | 7/2017 | Kang et al. | |
| 9,778,398 B2 | 10/2017 | Kang et al. | |
| 9,783,698 B2 | 10/2017 | Kang et al. | |
| 9,884,977 B2 | 2/2018 | Kang et al. | |
| 9,896,597 B2 | 2/2018 | Kang et al. | |
| 9,902,868 B2 | 2/2018 | Kang et al. | |
| 9,909,026 B2 | 3/2018 | Kang et al. | |
| 9,926,461 B2 | 3/2018 | Kang et al. | |
| 10,000,655 B2 | 6/2018 | Kang et al. | |
| 10,087,340 B2 | 10/2018 | Kang et al. | |
| 10,294,387 B2 | 5/2019 | Kang et al. | |
| 10,377,919 B2 | 8/2019 | Bae et al. | |
| 2005/0112365 A1 | 5/2005 | Hayashida et al. | |
| 2009/0155581 A1 | 6/2009 | Lee et al. | |
| 2009/0299001 A1* | 12/2009 | Sato | C09D 171/02 524/588 |
| 2015/0166827 A1* | 6/2015 | Chen | C08G 18/809 428/447 |
| 2015/0378060 A1* | 12/2015 | Kim | G02B 5/3033 428/421 |
| 2017/0298235 A1 | 10/2017 | Park et al. | |
| 2018/0237658 A1 | 8/2018 | Yoon et al. | |
| 2018/0346751 A1 | 12/2018 | Kim et al. | |
| 2020/0062996 A1* | 2/2020 | Kikuchi | B32B 27/28 |
| 2020/0282710 A1 | 9/2020 | Washio | |

FOREIGN PATENT DOCUMENTS

| | | |
|---|---|---|
| CN | 104710934 A | 6/2015 |
| CN | 106010022 A | 10/2016 |
| CN | 107298885 A | 10/2017 |
| JP | H09-217023 A | 8/1997 |
| JP | 2013-109169 A | 6/2013 |
| JP | 2015-003510 A | 1/2015 |
| JP | 2017-033031 A | 2/2017 |
| JP | 2018-092146 A | 6/2018 |
| JP | 2018-534168 A | 11/2018 |
| KR | 10-2010-0129512 A | 12/2010 |
| KR | 10-2012-0128734 A | 11/2012 |
| KR | 10-2013-0135152 A | 12/2013 |
| KR | 10-2015-0068240 A | 6/2015 |
| KR | 10-2016-0065940 A | 6/2016 |
| KR | 10-2017-0024559 A | 3/2017 |
| KR | 10-2017-0100808 A | 9/2017 |
| KR | 10-2017-0106781 A | 9/2017 |
| KR | 10-2018-0089172 A | 8/2018 |
| WO | 2018-189946 A1 | 10/2018 |

* cited by examiner

OPTICAL LAMINATE

CROSS-REFERENCE TO RELATED APPLICATION(S)

This application is a Continuation application of International Application No. PCT/KR2020/000613, filed on Jan. 13, 2020, which claims priority to or the benefit of Korean Patent Application No. 10-2019-0004839 filed with the Korean Intellectual Property Office on Jan. 14, 2019, the disclosure of which are incorporated herein by reference in their entirety.

The present disclosure relates to an optical laminate exhibiting improved adhesive strength and scratch resistance, together with excellent fingerprint resistance and high hardness properties.

TECHNICAL FIELD

Background of the Invention

With recent advancements of mobile devices such as smartphones and tablet PC, substrates for displays have recently been required to become lighter and slimmer. Display windows or front panels of such mobile devices are generally made of glass or reinforced glass both of which have excellent mechanical properties. However, the glass and reinforced glass themselves are heavy in weight which cause an increase in the weight of the mobile devices, and also have a problem of being easily damaged by an external impact, and further are low in flexibility and thus, are limited in their application to flexible or foldable display devices.

The research for plastic resin is actively underway as a material which can replace the glass. Since the plastic resin is lightweight, is less prone to fragile and has flexibility, it is suitable for the trend of pursuing the weight reduction and flexibility of mobile devices. Typically, polyethylene terephthalate (PET), polyether sulfone (PES), polyethylene naphthalate (PEN), polyacrylate (PAR), polycarbonate (PC), polyimide (PI), etc. are used, but in the case of a substrate using these plastic resins, there exists a problem that hardness and scratch resistance are insufficient compared with a glass material. Thus, a method has been attempted in which a resin composition is coated onto a plastic resin substrate to form a hard coating layer, thereby supplementing high hardness and abrasion resistance.

As an example, an acrylate-based resin capable of mainly UV curing is used for hard coating on a foldable display substrate. However, the acrylate-based resin has high shrinkage upon curing, resulting in severe curl, and therefore, it should proceed with a double-sided coating or a thin coating.

In addition, when a single-side coating is performed for hard coating on the foldable display substrate, a curl phenomenon occurs under heat and moisture resistance conditions due to a difference in thermal strain from the support substrate. Thus, a method of forming a hard coating layer on both surfaces of the substrate has been proposed, but there was a problem that the flexibility is not sufficient for application to a flexible display.

Moreover, conventionally, in order to impart fingerprint resistance to a hard coating, a method has been proposed in which additives for imparting a fingerprint resistance, such as a fluorine-containing compound, inorganic fine particles, conductive fine particles, a leveling agent, etc., are added to a hard coating layer.

However, the addition of additives for imparting the fingerprint resistance can lead to a decrease in surface hardness and curing density of the hard coating layer, instability of coating quality, etc., which are associated with the durability of the product.

Accordingly, there is a need to develop a hard coating material and an optical laminate that can exhibit fingerprint resistance while maintaining excellent flexibility and curl properties.

BRIEF SUMMARY OF THE INVENTION

The present disclosure provides an optical laminate which exhibits flexibility and curl properties equal to or higher than the conventional ones, has especially improved adhesive strength and scratch resistance, along with excellent fingerprint resistance and high hardness properties, and thus, can replaced reinforced glass cover windows.

In one aspect, there is provided an optical laminate including:

a support substrate layer having a thickness of 30 to 100 µm;

a hard coating layer disposed on both surfaces of the support substrate layer and having a thickness of 60 to 100 µm; and an fingerprint-resistant layer disposed on at least one surface of the hard coating layer and having a thickness of 10 nm to 5 µm, wherein the fingerprint-resistant layer includes a cured product of a binder resin; and an organic silane compound having at least one organic functional group selected from the group consisting of an epoxy group, a (meth)acryloxy group, a mercapto group and an amino group.

In another aspect, there is provided a polarizing plate including the above-mentioned optical laminate.

In yet another aspect, there is provided a display device including the above-mentioned optical laminate.

DETAILED DESCRIPTION OF THE INVENTION

Hereinafter, the optical laminate, a manufacturing method thereof, and an application thereof according to specific embodiments of the present disclosure will be described in more detail.

However, these embodiments are given by way of illustration only and the scope of the present disclosure is not limited thereby, and it will be apparent to those skilled in the art that various changes and modifications can be made to the embodiments within the scope and sprit of the present disclosure.

Unless otherwise specified throughout this specification, the technical terms used herein are only for reference to specific embodiments and is not intended to limit the present disclosure.

The singular terms used herein include plural terms unless phrases clearly express opposite meanings.

It should be understood that the terms "comprise", "include" and the like as used herein are intended to specify certain features, regions, integers, steps, operations, elements and/or components, and these do not preclude the existence or addition of other features, integers, steps, operations, elements, components and/or groups.

Further, the weight average molecular weight as used herein means a weight average molecular weight (unit: g/mol) in terms of polystyrene measured by GPC method. In the process of determining the weight average molecular weight in terms of polystyrene measured by the GPC method, a commonly known analyzing device, a detector such as a refractive index detector, and an analytical column can be used. Commonly applied conditions for temperature, solvent, and flow rate can be used. Specific examples of the measurement conditions man include a temperature of 30° C., chloroform solvent and a flow rate of 1 mL/min.

Further, the optical laminate according to the present disclosure may have a structure including at least one fingerprint-resistant layer on at least one surface of the hard coating layer, in the hard coating film in which the hard coating layer is formed on at least one surface of the transparent support substrate layer which is a substrate of a film. In a preferred example, the hard coating layer may be located on both surfaces of the support substrate layer and may be formed of one or more layers.

According to one embodiment of the present disclosure, there can be provided an optical laminate including: a support substrate layer having a thickness of 30 to 100 μm; a hard coating layer disposed on both surfaces of the support substrate layer and having a thickness of 60 to 100 μm; and an fingerprint-resistant layer disposed on at least one surface of the hard coating layer and having a thickness of 10 nm to 5 μm, wherein the fingerprint-resistant layer includes a cured product of a binder resin; and an organic silane compound having at least one organic functional group selected from the group consisting of an epoxy group, a (meth)acryloxy group, a mercapto group and an amino group.

Specifically, the optical laminate includes a hard coating layer on at least one surface of a transparent substrate layer which is a layer serving as a substrate of the hard coating film, and a fingerprint-resistant layer formed on at least one surface on the hard coating layer and having increased adhesion to the hard coating layer and an anti-fouling function.

The hard coating layer may be preferably formed on both surfaces of the transparent support substrate layer, and the fingerprint-resistant layer is preferably formed on the upper coating layer formed on the upper surface of the support substrate layer.

The optical laminate includes a resin layer having a specific composition on its upper and lower coating layers on the basis of the support substrate layer, thereby imparting excellent hardness properties and improved flexibility and curl properties. In addition, the present disclosure can further include a fingerprint-resistant layer on the upper coating layer in such a structure, thereby imparting excellent fingerprint resistance and abrasion resistance (scratch resistance).

In particular, the fingerprint-resistant layer may be formed by using a coating liquid containing a polymer resin having fingerprint resistance properties, and thus may have higher adhesion to the upper coating layer and impart excellent scratch resistance than a conventional composition for forming a fingerprint-resistant layer.

Specifically, the fingerprint-resistant layer may include a cured product of a composition including a binder resin and an organic silane compound.

In addition, the above-mentioned fingerprint-resistant layer can, unlike a conventional fingerprint-resistant layer composition, increase an adhesion with the hard coating layer to prevent shear breakage and loss of the anti-fingerprint layer due to the shear stress. Such a fingerprint-resistant layer may include a specific organic silane compound together with a binder, thereby remarkably improving an adhesion strength and a scratch resistance of the optical laminate for application to the reinforced glass cover window.

Not only the above components have excellent adhesion to the upper coating layer, exhibit an anti-fouling function and maintain high strength, but also it improves adhesion with the upper coating layer and can impart excellent scratch resistance.

The organic silane compound may be a compound having a functional group which acts as a silane coupling agent, and may include a compound which has at least one organic functional group and at least one hydrolysable group in one molecule, and has a alkoxy group, etc. in which the hydrolysable group is bonded to a silicon atom.

Preferably, the organic silane compound may be a silane compound having at least one organic functional group selected from the group consisting of an epoxy group, a (meth)acryloxy group, a mercapto group and an amino group. More specifically, the organosilane compound may be one or more selected from the group consisting of 2-(3,4-epoxycyclohexyl)-ethyltrimethoxysilane, 3-glycosyloxypropyl trimethoxysilane, 3-glycosyloxypropyl methyldiethoxysilane, 3-glycosyloxypropyl triethoxysilane, N-2-(aminoethyl)-3-aminopropyl methyldimethoxysilane, N-2-(aminoethyl)-3-aminopropyl trimethoxysilane, N-2-(aminoethyl)-3-aminopropyl triethoxysilane, 3-aminopropyl trimethoxy silane, 3-aminopropyl triethoxy silane, 3-ureido propyltrimethoxy silane, and 3-ureido propyltrialkoxy silane.

The organic silane compound may include 0.1 to 5.0% by weight based on the total weight of a composition containing the binder resin and the organic silane compound. When the content of the organosilane compound is less than 0.1% by weight, there is a problem that the adhesive strength is lowered due to the decrease in density, and the scratch resistance is reduced. When the content is 5.0% by weight or more, there is a problem that a coating property is reduced.

The binder resin may be at least one selected from the group consisting of a perfluoro polyether compound and a fluoro modified silicone compound. For example, the binder may include one or more selected from the group consisting of perfluoro metapolyacrylate and perfluoropolyethylene modified silane.

Further, in order to form the fingerprint-resistant layer, a solvent may be further included in addition to the binder resin and the organic silane compound described above. The type of the solvent is not limited, but preferably, it may be one or more selected from the group consisting of trifluorotoluene, chlorofluorocarbon, hydrofluorocarbon and alkoxyfluoroalkane having 2 to 20 carbon atoms. Further, the content of the solvent may be included as the remaining amount of the composition containing the binder resin and the organic silane compound.

In the method of forming the fingerprint-resistant layer, the fingerprint-resistant layer may be formed through general heat curing or photocuring after mixing the above-described components, and the curing method is not particularly limited. Further, the fingerprint-resistant layer may include a structure in which at least one or more layers are included on the upper coating layer within the above thickness range.

More specifically, embodiments of the present disclosure will be described with reference to the accompanying drawings.

Figure 1:
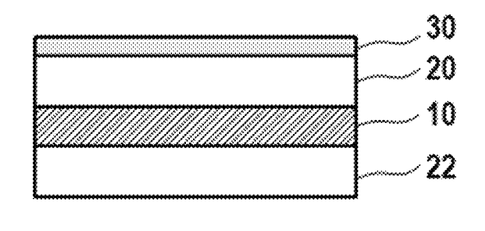
FIG. 1 schematically illustrates an optical laminate according to one embodiment of the present disclosure.

FIG. 1 schematically illustrates an optical laminate according to one embodiment of the present disclosure.

According to one preferred embodiment of the present disclosure, the hard coating layer may be located above and below the support substrate layer. (below, upper coating layer and lower coating layer). Further, the fingerprint-resistant layer may be formed on the upper coating layer.

Accordingly, as shown in FIG. 1, the optical laminate may include a support substrate layer 10, an upper coating layer 20 located on the support substrate layer, and a lower coating layer 22 located below the support substrate layer, and a fingerprint-resistant layer 30 located on the upper coating layer 20.

In such optical laminate, the upper coating layer 20 and the lower coating layer 22, which are located above and below the support substrate layer 10, include an epoxy polysiloxane of Chemical Formula 1 described below; an elastomeric polymer including polycaprolactone polyol; and a cured product of a reactive monomer containing at least one functional group capable of crosslinking with the epoxy polysiloxane. At this time, the cured product may be a photo-cured product or a heat-cured product.

Accordingly, according to one embodiment of the present disclosure, there can be provided an optical laminate including: a support substrate layer having a thickness of 30 to 80 μm; an upper coating layer disposed above the support substrate layer and having a thickness of 80 to 100 μm; and a lower coating layer disposed below the support substrate layer and having a thickness of 80 to 100 μm, wherein the upper coating layer and the lower coating layer includes an epoxy polysiloxane of Chemical Formula 1; an elastomeric polymer including polycaprolactone polyol; and a cured product of a reactive monomer containing at least one functional group capable of crosslinking with the epoxy polysiloxane, wherein the optical laminate include an fingerprint-resistant layer having the above-mentioned configuration which is disposed above the upper coating layer and has a thickness of 10 nm to 5 μm.

That is, the upper and lower coating layers including epoxy polysiloxane exhibiting excellent hardness properties are respectively included above and below the support substrate layer, and the upper and lower coating layers that come into contact with the applied substrate of the optical laminate further includes an elastomeric polymer in an optimal content ratio so that shrinkage of the epoxy polysiloxane upon curing can be minimized, thereby greatly improving a curl property and a bendability while exhibiting excellent surface hardness properties. In addition, the upper and lower coating layers of the present disclosure may include a reactive monomer including at least one functional group capable of crosslinking with the epoxy silane, thereby improving processability and coating adhesion.

In particular, since the optical laminate of the present disclosure includes, as a fingerprint-resistant layer, a coating layer including the above-mentioned organosilane having an adhesion to the upper coating layer and an anti-fouling function, it can exhibit all high functional effects such as high hardness, fingerprint resistance, abrasion resistance, etc. that can replace the reinforced glass cover window for display.

Thereby, the optical laminate can be usefully used as a material of a front part and a display part of various flexible or foldable elements. As an example, the optical laminate can be used as a reinforced glass cover window in a flexible or foldable display device.

Meanwhile, the hard coating layer may include an epoxy polysiloxane of the following Chemical Formula 1.

$$(R^1SiO_{3/2})_a(R^2SiO_{3/2})_b(OR)_c \quad \text{[Chemical Formula 1]}$$

in Chemical Formula 1,
$R^1$ is a glycidyl group represented by the following Chemical Formula 2; or glycidoxypropyl group,

[Chemical Formula 2]

in the Chemical Formula 2,
Ra is selected from the group consisting of a substituted or unsubstituted alkylene group having 1 to 6 carbon atoms, a substituted or unsubstituted alkenylene group having 2 to 20 carbon atoms, a substituted or unsubstituted alkynylene group having 2 to 20 carbon atoms, —Rb—CH=CH—COO-Rc-; —Rd-OCO—CH=CH—Re—, —RfORg-, -RhCOORi-, and -RjOCORk-, Rb to Rk are each independently a single bond, or a substituted or unsubstituted alkylene group having 1 to 6 carbon atoms $R^2$ is a substituted or unsubstituted alkyl group having 1 to 20 carbon atoms, a substituted or unsubstituted cycloalkyl group having 3 to 20 carbon atoms, a substituted or unsubstituted alkenyl group having 2 to 20 carbon atoms, a substituted or unsubstituted alkynyl group having 2 to 20 carbon atoms, a substituted or unsubstituted aryl group having 6 to 20 carbon atoms, a substituted or unsubstituted arylalkyl group having 7 to 20 carbon atoms, a substituted or unsubstituted alkylaryl group having 7 to 20 carbon atoms, an epoxy group or a hydrogen atom, R is a hydrogen atom or an alkyl group having 1 to 20 carbon atoms, and a, b, and c are each
$0<a<1$, $0 \leq b<1$ and $0<c<1$.

The epoxy polysiloxane represented by Chemical Formula 1 includes a silsesquioxane unit of $(R^1SiO_{3/2})$ as a T3 unit.

In the silsesquioxane structural unit of the $(R^1SiO_{3/2})$, $R^1$ is a functional group represented by Chemical Formula 2, wherein each R' is independently selected from the group consisting of a hydrogen atom, a halogen group, a methyl group, an ethyl group, a propyl group, a butyl group, a hydroxy group, a methoxy group, an ethoxy group, an acryl group, a methacryl group, an acetyl group, a formyl group, and a carboxyl group, R" may be a linear or branched alkylene group having 1 to 4 carbon atoms such as a methylene group, an ethylene group, a propylene group, or an isobutylene group. More specifically, each R' is independently a hydrogen atom, a halogen group, a methyl group or an ethyl group, R" may be a linear alkylene group having 1 to 4 carbon atoms. Considering the surface hardness and curabiity of the cured product, a glycidyl group in which each R' is a hydrogen atom and R" is a methylene group may be more preferred.

Further, the epoxy polysiloxane may further include a silsesquioxane unit of the $(R^2SiO_{3/2})$ as a T 3 unit together with the silsesquioxane unit of the $(R^1SiO_{3/2})$. The silsesquioxane unit of the $(R^2SiO_{3/2})$ can increase the curing density of the epoxy polysiloxane and thus improve surface hardness properties of the hard coating layer.

In the silsesquioxane structural unit of the $(R^2SiO_{3/2})$, $R^2$ may be selected from the group consisting of a substituted or unsubstituted alkyl group having 1 to 12 carbon atoms, a substituted or unsubstituted cycloalkyl group having 3 to 12 carbon atoms, an substituted or unsubstituted aryl group having 6 to 12 carbon atoms, a substituted or unsubstituted arylalkyl group having 7 to 12 carbon atoms, a substituted or unsubstituted alkylaryl group having 7 to 12 carbon atoms, an epoxy group, and a hydrogen atom.

Further, the $R^2$ may be substituted with one or more substituents selected from the group consisting of an alkyl group having 1 to 12 carbon atoms, a cycloalkyl group having 3 to 12 carbon atoms, an alkenyl group having 2 to 12 carbon atoms, a hydroxyl group, an alkoxy group having 1 to 12 carbon atoms, an amino group, an acryl group, a methacryl group, a halogen group, a mercapto group, an ether group, an ester group, an acetyl group, a formyl group, a carboxyl group, a nitro group, a sulfonyl group, an urethane group, an epoxy group, an oxetane group and a phenyl group, and more specifically, it may be substituted with one or more substituents selected from the group consisting of an acrylic group, a methacryl group, a vinyl group, an allyl group, an epoxy group and an oxetane group.

Among them, in view of the fact that the curing density of the epoxy polysiloxane is further increased and thus, the surface hardness properties of the hard coating layer can be further improved, the $R^2$ may be, more particularly, an alkyl group having 1 to 6 carbon atoms or an aryl group having 6 carbon atoms, which is unsubstituted or substituted with one or more substituents selected from the group consisting of an acrylic group, a methacryl group, a vinyl group, an allyl group, an epoxy group and an oxetane group, or may be an epoxy group.

Further, the epoxy group is a functional group containing an oxirane ring, and includes an alicyclic epoxy group, an aliphatic epoxy group, and an aromatic epoxy group, whit the proviso that the glycidyl group defined in Chemical Formula 2 is excluded.

Moreover, the epoxy polysiloxane can contain the structural unit of (OR). By including the structural unit, it is possible to improve flexibility while maintaining excellent hardness properties. The R may specifically be a hydrogen atom or an alkyl group having 1 to 12 carbon atoms, and more specifically, it may be a hydrogen atom or a linear or branched alkyl group having 1 to 4 carbon atoms such as a methyl group, an ethyl group, a propyl group, an isopropyl group, a butyl group and an isobutyl group.

Epoxy polysiloxanes including the above-mentioned structural units can be prepared by hydrolysis and condensation reaction of a siloxane monomer of each structural unit, specifically, an alkoxysilane having an epoxy alkyl group alone, or between an alkoxysilane having an epoxy alkyl group and a heterogeneous alkoxysilane. At this time, the molar ratio of each structural unit can be controlled through the adjustment of the content ratio of the alkoxysilane. Specifically, in Chemical Formula 1, a, b, and c each represent a molar ratio of $(R^1SiO_{3/2})$ unit, $(R^2SiO_{3/2})$ unit and (OR) unit constituting the epoxy polysiloxane, wherein $0<a<1$, $0\leq b<1$ and $0<c<1$.

Further, the epoxy polysiloxane includes 70 mol % or more, more specifically, 70 mol % or more and 100 mol % or less of the structural unit of $(R^1SiO_{3/2})$, based on the total amount (i.e., 100 mol %) of the T unit constituting the above-mentioned epoxy polysiloxane, under the conditions that satisfy the above-mentioned content range of each structural unit, and thereby, the curing density is increased when forming the hard coating film, and as a result, the optical laminate may exhibit a significantly improved surface hardness (expressed in molar ratio, $0.7\leq a/(a+b)\leq 1$). When the molar content of the structural unit of $(R^1SiO_{3/2})$ in the epoxy polysiloxane is less than 70 mol %, it is difficult for the upper and lower coating layers to exhibit sufficient surface hardness due to a decrease in the curing density. More specifically, the structural unit of $(R^1SiO_{3/2})$ may include 70 mol % or more and less than 85 mol %, or 85 mol % or more and 100 mol % or less based on the total amount (i.e., 100 mol %) of T unit.

Moreover, when the epoxy polysiloxane further contains the structural unit of the $(R^2SiO_{3/2})$, it can be included as the molar ratio ($0<b<1$) corresponding to b. More specifically, it may further include a structural unit of $(R^2SiO_{3/2})$ in a molar ratio satisfying $0<b<0.5$ or $0.01\leq b\leq 0.5$, more specifically $0.1\leq b\leq 0.3$. In the case of including the structural unit of $(R^2SiO_{3/2})$ within the above content range, it is possible to increase the curing density of the epoxy polysiloxane and thus improve the surface hardness properties of the hard coating layer.

Further, the epoxy polysiloxane may include the (OR) unit in the range of c described above ($0<c<1$), and more specifically, it may further include the (OR) unit in a molar ratio satisfying $0<c<0.5$, more specifically $0.01\leq c\leq 0.3$ or $0.01\leq c\leq 0.05$. In the case of including the (OR) unit within the above content range, it is possible to improve flexibility while maintaining excellent hardness properties.

Further, under the conditions satisfying the above content range, the total (a+b+c) of the molar ratios of each structural unit contained in the epoxy polysiloxane is 1.

Meanwhile, the content of each structural unit constituting the epoxy polysiloxane can be obtained by $^1$H-NMR or $^{29}$Si-NMR spectrum measurement.

Further, the epoxy polysiloxane may have an epoxy equivalent weight (g/eq) of 3.0 to 6.3 g/eq. When epoxy group equivalent is within the above range, a dense cross-linking can be performed at the time of polymerization, and superior hardness properties can be exhibited. More specifically, the epoxy polysiloxane may have an epoxy group equivalent weight of 4 to 6 g/eq. The epoxy equivalent weight is a value obtained by dividing the molecular weight of the epoxy polysiloxane by the number of epoxies, and can be analyzed by chemical titration method.

Further, the weight average molecular weight, molecular weight distribution, etc. of the above epoxy polysiloxane may be adjusted through the control of the reaction rate using the reaction temperature during production, the amount of catalyst, the type of solvent, etc., but epoxy polysiloxane usable in the present disclosure may be those having a weight average molecular weight of 1,000 to 50,000 g/mol. By having the weight average molecular weight in the above range, more excellent hardness properties can be exhibited. If the weight average molecular weight is less than 1,000 g/mol, the hardness is not realized and rather ductility is likely to be expressed. Further, when it exceeds 50,000 g/mol, high hardness is exhibited, but film processability is reduced. More specifically, the weight average molecular weight may be 1,200 to 15,000 g/mol.

Further, the epoxy polysiloxane may have a number average molecular weight (Mn) of 1,000 to 10,000 g/mol, more specifically 1,000 to 8,000 g/mol together with the Mw described above. When the above number average molecular weight condition is satisfied, the compatibility with other components in the resin composition for forming a hard coating layer may be increased, and the surface hardness of the cured product may be improved, thereby further improving heat resistance and abrasion resistance of the cured product.

Further, the epoxy polysiloxane may have a molecular weight distribution (Mw/Mn) of 1.0 to 3.0, more specifically 1.1 to 2.5. When the molecular weight distribution is within the above range, the effect of improving the surface hardness is more excellent, and the epoxy polysiloxane exists in a liquid state, and thus, the handling is easy.

The weight average molecular weight and the number average molecular weight of the epoxy polysiloxane refer to the converted values with respect to a standard polystyrene as measured by gel permeation chromatography.

Meanwhile, in the optical laminate according to one embodiment of the present disclosure, the hard coating layer may further include an elastomeric polymer including a polycaprolactone polyol. In such a case, the hard coating layer may further include an elastomeric polymer in a weight ratio of 95:5 to 60:40 together with the epoxy polysiloxane of Chemical Formula 1, but the ratio is not particularly limited.

The elastomeric polymer is included in the upper coating layer and the lower coating layer facing the substrate to which the optical laminate is applied, and thereby, stress resistance properties are given through high toughness to the lower coating layer, and shrinkage during curing can be minimized. As a result, the curl properties can be improved, and at the same time, flexibility such as bending property can be improved. However, when the elastomeric polymer is added in excess, specifically, when the total amount of the epoxy polysiloxane and the elastomeric polymer exceeds 40% by weight, there is a possibility that curl properties may be significantly reduced. Further, when the elastomeric polymer is added in a small amount, specifically, when the content is less than 5% by weight relative to the total amount of epoxy polysiloxane and elastomeric polymer, the improvement effect due to the inclusion of the elastomeric polymer is not sufficiently obtained, and there is a possibility that curl properties and bendability are reduced. More specifically, considering the remarkable effect of improving the curl properties and bendability due to the control of the content ratio of the elastomeric polymer, the elastomeric polymer may be included in an amount such that the epoxy polysiloxane of Chemical Formula 1 and the elastomeric polymer satisfy a weight ratio of 92:8 to 65:35, and more specifically 90:10 to 65:35.

Examples of the elastomeric polymer include alkanediol having 1 to 20 carbon atoms, polyolefin polyol, polyester polyol, polycaprolactone polyol, polyether polyol or polycarbonate polyol, and the like, and any one thereof or a mixture of two or more thereof may be used. These elastomeric polymers can be crosslinked and polymerized by ultraviolet irradiation as compared to conventional elastomeric polymers such as rubber, and high hardness and flexibility can be achieved without deterioration of the other physical properties. Among these, the elastomeric polymer may be a polycaprolactone diol represented by the following Chemical Formula 3:

Furthermore, in the optical laminate according to one embodiment of the present disclosure, the hard coating layer may further include a reactive monomer. The reactive monomer includes at least one functional group capable of crosslinking with the above-mentioned epoxy polysiloxane, thereby lowering the viscosity of the epoxy polysiloxane, facilitating processability, and improving the adhesion of the coating.

Specifically, the reactive monomer may include a compound including an alicyclic epoxy group, a glycidyl group, or an oxetane group as a functional group capable of crosslinking with epoxy polysiloxane, and any one thereof or a mixture of two or more thereof may be used.

The compound including an alicyclic epoxy group may include 4-vinylcyclohexene dioxide, cyclohexene vinyl monooxide, (3,4-epoxycyclohexyl)methyl 3,4-epoxycyclohexylcarboxylate, 3,4-epoxycyclohexylmethyl methacrylate, 3,4-epoxycyclohexanecarboxylate, 2-(3,4-epoxycyclohexyl)-1,3-dioxolane, limonene dioxide, vinylcyclohexene dioxide, bis(3,4-epoxycyclohexylmethyl)adipate, or the like, and any one thereof or a mixture of two or more thereof may be used. Moreover, the compound containing an glycidyl group may include bisphenol A diglycidyl ether, p-butyl phenol glycidyl ether, butyl glycidyl ether, cresyl glycidyl ether, allyl glycidyl ether, phenyl glycidyl ether, diglycidyl ether, butanediol diglycidyl ether, diethylene glycol diglycidyl ether, or the like, and any one thereof or a mixture of two or more thereof may be used. Further, the compound including an oxetane group may include 3-methyloxetane, 2-methyloxetane, 3-oxetanol, 2-methyleneoxetane, 3-methyl-3-hydroxymethyloxetane, 3-ethyl-3-hydroxymethyloxetane, 3,3-oxetanedimethane thiol, 2-ethylhexyl oxetane, 4-(3-methyloxetane-3-yl)benzonitrile, N-(2,2-dimethylpropyl)-3-methyl-3-oxetanemethanamine, N-(1,2-dimethylbutyl)-3-methyl-3-oxetanemethanamine, xylylene bisoxetane, 3-ethyl-3[{(3-ethyloxetane-3-yl)methoxy}methyl]oxetane, (3-ethyloxetane-3-yl) methyl (meth)acrylate, 4-[(3-ethyloxetane-3-yl)methoxy]butan-1-ol or the like, and any one thereof or a mixture of two or more thereof may be used.

When the reactive monomer is further included, it may be included in an amount of 5 to 30 parts by weight based on 100 parts by weight of the epoxy polysiloxane. When the content of the reactive monomer is less than 5 parts by weight, the improvement effect due to the inclusion of the reactive monomer is insignificant. When the content exceeds 30 parts by weight, the viscosity of the epoxypolysiloxane is too low due to the excess reactive monomer, and the processability may be rather deteriorated. More specifically,

[Chemical Formula 3]

In Chemical Formula 3, n is an integer of 1 or more, more specifically, an integer of 1 to 20. In addition, the n may be calculated from the weight average molecular weight of polycaprolactone diol.

In the polycaprolactone diol, an ester group and an ether group are contained and repeated in the repeating unit at the same time, and thereby, it may exhibit a more excellent effect in terms of flexibility, hardness and impact resistance when used in combination with the epoxy polysiloxane of the Chemical Formula 1.

the reactive monomer may be included in an amount of 7 to 15 parts by weight, more specifically 9 to 12 parts by weight based on 100 parts by weight of the epoxy polysiloxane.

Further, in the optical laminate according to one embodiment of the present disclosure, at least one of the hard coating layers formed on the upper and lower parts of the support substrate layer may further include an acrylate-based compound in order to improve surface hardness.

The acrylate-based compound may include polyfunctional acrylate-based compounds, such as 2-ethylhexyl acrylate, octadecyl acrylate, isodecyl acrylate, 2-phenoxyethyl acrylate, lauryl acrylate, stearyl acrylate, behenyl acrylate, tridecyl methacrylate, nonylphenol ethoxylate monoacrylate, β-carboxyethyl acrylate, isobornyl acrylate, tetrahydrofurfuryl acrylate, tetrahydrofurfuryl methacrylate, 4-butyl-cyclohexyl acrylate, dicyclopentenyl acrylate, dicyclopentenyl oxyethyl acrylate, ethoxyethoxyethyl acrylate, ethoxylated monoacrylate, 1,6-hexanediol diacrylate, triphenyl glycol diacrylate, butanediol diacrylate, 1,3-butylene glycol dimethacrylate, 1,6-hexanediol dimethacrylate, neopentyl glycol diacrylate, ethylene glycol dimethacrylate, diethylene glycol diacrylate, diethylene glycol dimethacrylate, tetraethylene glycol diacrylate, tetraethylene glycol dimethacrylate, triethylene glycol diacrylate, triethylene glycol dimethacrylate, polyethylene glycol diacrylate, polyethylene glycol dimethacrylate, dipropylene glycol diacrylate, ethoxylated neopentylglycol diacrylate, trimethylolpropane triacrylate, trimethylolpropane trimethacrylate, pentaerythritol triacrylate, pentaerythritol trimethacrylate, pentaerythritol tetramethacrylate, pentaerythritol tetraacrylate, ethoxylated triacrylate, tris(2-hydroxyethyl)isocyanurate triacrylate, di pentaerythritol pentaacrylate, ditrimethylolpropane tetraacrylate, alkoxylated tetraacrylate, or the like, preferably, pentaerythritol triacrylate, pentaerythritol trimethacrylate, pentaerythritol tetramethacrylate, pentaerythritol tetraacrylate or the like, and any one thereof or a mixture of two or more thereof may be used.

In addition, the acrylate-based compound may include acrylate-based oligomers such as polyester acrylate, polyether acrylate, urethane acrylate or epoxy acrylate, and any one thereof or a mixture of two or more thereof may be used.

Among the above acrylate-based compounds, urethane acrylate oligomers may be more preferably used in consideration of the remarkable effect of improving the surface hardness when used in combination with the above-mentioned epoxy polysiloxane.

The urethane acrylate-based oligomer may have 6 to 9 functional groups. When the number of functional groups are less than 6, the effect of improving the hardness may be insignificant, and when it is more than 9, the hardness is excellent, but the viscosity can be increase. Further, as the urethane (meth)acrylate oligomer, those used in the art can be used without limitation. Preferably, those prepared by reacting a compound having at least one isocyanate group in the molecule with a (meth)acrylate compound having at least one hydroxyl group in the molecule may be used.

When the acrylate-based compound is further included, it may be included in an amount of 0.1 to 20 parts by weight based on 100 parts by weight of the epoxy polysiloxane. When the content of the reactive monomer is less than 0.1 parts by weight, the improvement effect due to the inclusion of the acrylate-based compound is insignificant, and when it exceeds 20 parts by weight, the effect of improving the surface hardness may be rather inhibited due to the excess acrylate compound. More specifically, the acrylate-based compound may be included in an amount of 1 to 15 parts by weight, and more specifically 5 to 15 parts by weight, based on 100 parts by weight of the epoxy polysiloxane.

Together with the components described above, the hard coating layer may include independently one or more additives commonly used in the technical field to which the present disclosure belongs, such as antioxidants, surfactants, yellowing inhibitors, inorganic fillers, lubricants, coating aids, and antifouling agents. The additives will be described in more detail in the Preparation Examples below.

Meanwhile, in general, as the thickness of the hard coating layer becomes thicker, the strength is increased. However, if the thickness is too thick, it is likely to break when folding. Further, if the thickness is too thin, the strength may be poor even if the folding property is secured. Thus, according to one embodiment of the present disclosure, it is preferable that the hard coating layer formed on both surfaces of the support substrate layer has a thickness of 60 µm to 100 µm. Furthermore, the thickness ratio of the upper coating layer and the lower coating layer within the above thickness range may be more preferably 1:1 to 1:1.5, more specifically 1:1 to 1:1.3. If the thickness of each coating layer is less than 60 µm, there is a possibility that the strength properties are lowered, If it exceeds 100 µm, there is a possibility that the flexibility is lowered. In addition, when the thickness of the lower coating layer is too thick compared to the thickness of the upper coating layer, there is a possibility that the effect of curl balance and high hardness compared to the thickness is lowered. In addition, when the thickness of the upper coating layer is too thick compared to the lower coating layer, there is a fear that curl balance and flexibility is reduced.

Meanwhile, in the optical laminate according to an embodiment of the present disclosure, when a fingerprint-resistant layer 30 is included on the upper coating layer 20, in accordance with one embodiment, the fingerprint-resistant layer may be formed to locate on the upper coating layer and have a thickness of 10 nm to 5 µm or 10 nm to 5 µm or 10 nm to 1 µm.

At this time, if the thickness of the fingerprint-resistant layer is 10 nm or less, there is a problem that the surface modification degree is lowered, the water contact angle is lowered and durability is weakened. If the thickness is 5 µm or more, there is a problem that the folding properties are lowered due to a heat shrinkage of the anti-fingerprint layer and an increase of stress by the film thickness.

Meanwhile, the support substrate layer in the optical laminate according to one embodiment of the present disclosure is located between the upper coating layer and the lower coating layer.

The support substrate layer may include a transparent plastic resin. Specific examples of the plastic resins include polyester-based resin, cellulose-based resin, polycarbonate-based resin, acrylic-based resin, styrene-based resin, polyolefin-based resin, polyimide-based resin, polyether sulfone-based resin, sulfone-based resin, and the like, and any one thereof or a mixture of two or more thereof may be used.

More specifically, the support substrate layer may include at least one selected among polyethyleneterephtalate (PET), cyclic olefin copolymer (COC), polyacrylate (PAC), polycarbonate (PC), polyethylene (PE), polymethylmethacrylate (PMMA), polyetheretherketon (PEEK), polyethylenenaphthalate (PEN), polyetherimide (PEI), polyimide (PI), and triacetylcellulose (TAC).

The above support substrate may be a single layer or a multilayer structure including two or more layers composed of the same or different materials. In one example, the support substrate layer may be a multilayer structure of polyethylene terephthalate (PET), a multi-layered structure formed by coextrusion of polymethyl methacrylate (PMMA)/polycarbonate (PC), or a monolayer structure including a copolymer of polymethyl methacrylate (PMMA) and polycarbonate (PC).

Further, the support substrate layer may be subjected to plasma surface treatment, if necessary, and the method is not particularly limited and may be performed according to a conventional method.

Further, if the thickness of the support substrate layer is excessively thick or thin, it is problematic in terms of surface hardness, a decrease in impact resistance or folding properties, and therefore, it may be desirable to appropriately set the range. For example, the support substrate layer may have a thickness of 30 to 100 μm, more specifically 50 to 80 μm.

The optical laminate according to one embodiment of the present disclosure having the above structure and configuration can be produced a method in which the first resin composition for forming an upper coating layer is coated onto one surface of the support substrate layer and then cured to form an upper coating layer, a second resin composition for forming a lower coating layer is coated onto one surface of the support substrate layer on which the upper coating layer is not formed, and then cured to form a lower coating layer, and a third resin composition for forming a fingerprint-resistant layer is coated onto the coating layer and then cured to form a fingerprint-resistant layer. At this time, the order in which the upper coating layer and the lower coating layer are formed may be changed. As another method, it can be produced by a method in which the first and second resin compositions may be respectively coted onto both surfaces of the support substrate layer, and then cured. At this time, the order in which the upper and lower coating layers are formed is not particularly limited, and may be appropriately changed in consideration of process easiness and the like.

The first resin composition for forming the upper coating layer may include an elastomeric polymer in a weight ratio of 95:5 to 60:40 together with the epoxy polysiloxane. Further, the second resin composition for forming the lower coating layer also includes an elastomeric polymer in a weight ratio of 95:5 to 60:40 together with the epoxy polysiloxane. At this time, the epoxy polysiloxane and the elastomeric polymer are the same as described above.

Further, the first and second resin compositions may further include at least one of the above-described reactive monomers and acrylate compounds.

Further, the first and second resin compositions may each independently contain 0.1 to 10 parts by weight of an initiator based on 100 parts by weight of the above-described epoxy polysiloxane. If the content of the initiator is less than 0.1 part by weight, only surface curing may occur or epoxy curing may not occur sufficiently, resulting in low hardness. In addition, when the content of the initiator exceeds 10 parts by weight, it may cause cracking and peeling of the hard coating layer due to a fast curing rate. More specifically, it may be contained in an amount of 0.5 to 5 parts by weight or 1 to 4 parts by weight.

The initiator may be a photopolymerization or thermal polymerization initiator well known in the art, and the type thereof is not particularly limited. For example, the photopolymerization initiator may include one or more selected from the group consisting of an aryl sulfonium hexafluoroantimonate salt, an aryl sulfonium hexafluorophosphate salt, a diphenyldiodonium hexafluorophosphate salt, a diphenyldiodonium hexaantimonate salt, a ditolyliodonium hexafluorophosphate salt and a 9-(4-hydroxyethoxyphenyl) thianthrenium hexafluorophosphate salt, but may not be limited thereto. The thermal polymerization initiator may include one or more selected from the group consisting of a 3-methyl-2-butenyltetramethylenesulfonium hexafluoroantimonate salt, an ytterbium trifluoromethenesulfonate salt, a samarium trifluoromethenesulfonate salt, an erbium trifluoromethenesulfonate salt, a dysprosium trifluoromethenesulfonate salt, a lanthanum trifluoromethenesulfonate salt, a tetrabutylphosphonium methenesulfonate salt, an ethyltriphenylphosphonium bromide salt, benzyldimethylamine, dimethylaminomethylphenol, triethanolamine, N-n-butylimidazole and 2-ethyl-4-methylimidazole, but may not be limited thereto.

The first and second resin composition can be used in a solvent-free manner when there is no problem in the process. However, in order to adjust the viscosity and fluidity of the composition during coating, and to increase the coatability of the composition to the support substrate, it may optionally further include an organic solvent.

When the organic solvent is further included in the first and second resin compositions, as the organic solvent, alcohol based solvents such as methanol, ethanol, isopropyl alcohol, or butanol; alkoxy alcohol based solvents such as 2-methoxyethanol, 2-ethoxyethanol, or 1-methoxy-2-propanol; ketone based solvents such as acetone, methyl ethyl ketone, methyl isobutyl ketone, methyl propyl ketone, or cyclohexanone; ether based solvents such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethyl glycol monopropyl ether, diethyl glycol monobutyl ether, or diethylene glycol-2-ethylhexyl ether; acetate-based solvents such as propylene glycol monomethyl ether acetate, ethylene glycol monoethyl ether acetate, diethylene glycol monobutyl ether acetate, diethylene glycol monoethyl ether acetate; or aromatic solvents such as benzene, toluene or xylene, etc. can be used alone or in combination.

Further, the first and second resin compositions may further include an acrylate-based compound for improving surface hardness as described above, in addition to the above-described components, and it may include one or more additives commonly used in the technical field to which the present disclosure belongs, such as antioxidants, surfactants, yellowing inhibitors, inorganic fillers, lubricants, coating aids, and antifouling agents. Further, since the content can be variously adjusted within a range that does not deteriorate the physical properties of the hard coating film of the present disclosure, it is not particularly limited, but for example, it may be contained in an amount of 0.1 to 10 parts by weight with respect to 100 parts by weight of the epxoysiloxane.

As an example, the antioxidant is used for suppressing an oxidation reaction caused by the polymerization initiator, and may include one or more mixtures selected from the group consisting of phenolic-based antioxidant, phosphate-based antioxidant, amine-based antioxidant, thioester-based antioxidant, and the like, but may not be limited thereto. The surfactant may be mono- or bifunctional fluorine-based acrylate, fluorine-based surfactant or silicon-based surfactant. At this time, the surfactant may be included in a form of being dispersed or crosslinked in the crosslinked copolymer. In addition, the yellowing inhibitors may include a benzophenone-based compound or a benzotriazole-based compound.

The coating step to the support substrate layer of the resin composition for forming the upper and lower coating layers as described above can be carried out by a known method such as a die coater, an air knife, a reverse roll, spray, a blade, casting, gravure, spin coating, or bar coating.

Further, in the coating step, the coating of the first and second resin compositions may be performed once or more than once so that the thickness of each coating layer after curing satisfies the above-described thickness range and conditions.

A step for curing may be performed after each resin composition is coated, and the curing may be performed by heat-curing or photo-curing according to a conventional method.

Heat treatment or light irradiation conditions for the heat-curing and photo-curing may be appropriately controlled through adjustment of the wavelength region and the amount of light, or the heat treatment temperature according to the type of the initiator.

In the optical laminate according to one embodiment of the present disclosure, prepared according to the method as described above, the hard coating layers including: an epoxy polysiloxane having excellent hardness properties, an elastomeric polymer that can minimize the shrinkage during curing and thus improve curl properties and at the same time improve bendability and flexibility, and the above-mentioned reactive monomer capable of improving the adhesion, are respectively formed on the upper and lower parts of the support substrate layer, thereby significantly improving the flexibility and providing an effect of being extremely small in bending deformation, while maintaining excellent surface hardness and strength properties. In addition, the optical laminate of the present disclosure may exhibit excellent fingerprint resistance and improved abrasion resistance and has transparency, by including a fingerprint-resistant layer onto the upper hard coating layer.

Meanwhile, according to another embodiment of the present disclosure, there can be provided a polarizing plate including the optical laminate.

The polarizing plate may include the optical laminate as a polarizer protective film or cover window.

The polarizing plate of the embodiment includes a polarizer. As the polarizer, a polarizer well known in the art, for example, a film composed of polyvinyl alcohol (PVA) containing iodine or dichroic dyes may be used. In this case, the polarizer may be manufactured by dying iodine or dichromatic dyes on the polyvinyl alcohol film and stretching the film, but the manufacturing method is not particularly limited.

Meanwhile, when the polarizer is a polyvinyl alcohol film, the polyvinyl alcohol film may be used without particular limitation as long as it contains a polyvinyl alcohol resin or a derivative thereof. At this time, examples of the derivative of the polyvinyl alcohol resin include, but are not limited to, polyvinyl formal resin, polyvinyl acetal resin, and the like. Alternatively, the polyvinyl alcohol film may be a commercially available polyvinyl alcohol film generally used for the production of polarizers in the art, for example, P30, PE30 or PE60 manufactured by Kuraray, M3000, or M6000 manufactured by Nippon Synthetic Chemical Industry Co., Ltd., or the like.

Meanwhile, the polyvinyl alcohol film may have a degree of polymerization of 1,000 to 10,000, or 1,500 to 5,000, without being limited thereto. When the degree of polymerization satisfies the above range, molecules may move freely and may be smoothly combined with iodine, a dichroic dye, or the like. Further, the polarizer may have a thickness of 40 μm or less, 30 μm or less, 20 μm or less, 1 to 20 μm, or 1 μm to 10 μm. In this case, devices, such as a polarizing plate and an image display device containing the polarizer can be made thinner and lighter.

The polarizing plate may further include an adhesive layer which is located between the polarizer and the polymer substrate of the optical laminate and which has a thickness of 0.1 μm to 5 μm.

In the adhesive layer, various polarizing plate adhesives used in the art, for example, polyvinyl alcohol-based adhesives, polyurethane-based adhesives, acrylic-based adhesives, cationic-based or radical-based adhesives and the like can be used as the adhesive without limitation.

According to the other embodiment of the present disclosure, there can be provided a display device including the above-described optical laminate or polarizing plate.

Specific examples of the display device are not limited, and may be, for example, a device such as a liquid crystal display, a plasma display device, or an organic light emitting diode device, and may be a flexible display.

As one example, the display device may be a liquid crystal display device including a pair of polarizing plates facing each other; a thin film transistor, a color filter, and a liquid crystal cell sequentially stacked between the pair of polarizing plates; and a light unit.

In the display device, the optical laminate or the polarizing plate may be provided on the outermost surface of a display panel facing an observer or on the outermost surface thereof facing a backlight.

In another example, the display device may include a display panel; and a polarizing plate disposed on at least one surface of the display panel.

The display device may be a liquid crystal display device including a liquid crystal panel and an optical laminate provided on both surfaces of the liquid crystal panel, wherein at least one of the polarizing plates may be a polarizing plate including a polarizer according to one embodiment of the present disclosure.

At this time, the type of liquid crystal panel included in the liquid crystal display device is not particularly limited, but for example, a known panel such as a passive matrix-type panel such as a twisted nematic (TN), super twisted nematic (STN), ferroelectric (F) or polymer dispersed (PD) panel, an active matrix-type panel such as a two or three terminal panel, an in-plane switching (IPS) panel or a vertical alignment (VA) panel may be used.

Advantageous Effects

The optical laminate according to the present disclosure further includes a fingerprint-resistant layer containing an organic functional silane compound in a predetermined thickness in addition to the substrate and the hard coating layer, and thereby, it can exhibit excellent fingerprint resistance and hardness properties and improve scratch resistance through an increase in adhesive strength. In addition, the optical laminate of the present disclosure can increase shear stress due to adhesion of the fingerprint-resistant layer and the hard coating layer, and thereby exhibits improved abrasion resistance, and at the same time can exhibit excellent flexibility and curl properties. Therefore, the optical laminate of the present disclosure can replace the existing reinforced glass cover window, and thus can be particularly usefully applied to a flexible or foldable display device.

DETAILED DESCRIPTION OF THE EMBODIMENTS

Hereinafter, embodiments of the present disclosure will be described in more detail by way of examples. However, these examples are provided for illustrative purposes only and are not intended to limit the scope of the present disclosure.

Hereinafter, each compound used in the following Preparation Examples is as follows:

(a) Epoxypolysiloxane:

Epoxy polysiloxane 1 prepared according to the following method was used.

3-Glycidoxypropyltrimethoxysilane (KBM-403, Shin Etsu), water and toluene were put as a silane monomer in a 1000 mL 3-neck flask, and stirred. (KBM-403:water=1 mol: 0.2 mol). To the resulting mixed solution, a basic catalyst (TMAH) was added in an amount of 1 part by weight based on 100 parts by weight of the silane monomer, and the mixture was reacted at 100° C. to produce an epoxy polysiloxane 1 of the following composition including 100 mol % of glycidoxypropyl modified silicone (below, GP). (Mw: 2,700 g/mol, Mn: 2,100 g/mol, epoxy equivalent weight: 5.9 g/eq)

(b) reactive monomer: bisphenol A diglycidyl ether (manufactured by Alfa) was used.

(c) elastomers: polycaprolactone diol having the following structure was used.

(Mw=2,000 g/mol, manufactured by Sigma Aldrich)

[Chemical Formula 3]

(in Chemical Formula 3, n is determined from the Mw value)

Preparation Example 1

Each component was mixed to produce a resin composition (coating liquid) for forming a hard coating layer. At this time, based on 100 parts by weight of the epoxy polysiloxane, 3 parts by weight of an iodonium-based compound (Omnicat 250™, manufactured by BASF) as an initiator, 10 parts by weight of toluene as a solvent, and 0.2 parts by weight of a fluorine-based compound (RS55™, manufactured by MEGAFACE) as an additive were used. (below, H/C-1)

Preparation Example 2

After mixing in the same manner as in Preparation Example 1, 1 part by weight of perfluoro-modified silane, 0.05 part by weight of aminoethyl(aminopropyl)trimethoxysilane, and 5 parts by weight of trifluorotoluene were further mixed to give a coating solution (H/C-2).

Preparation Example 3

15 wt % of perfluoropolyethylene-modified silane (Mw: 4,400), 0.7 wt % of aminoethyl(aminopropyl)trimethoxysilane, and 84.3 wt % of trifluorotoluene were used to prepare a composition for forming a fingerprint-resistant layer. (below, AF-1)

Preparation Example 4

15 wt % t of perfluoropolyethylene polymethacrylate (Mw: 5,300), 0.7 wt % aminoethyl(aminopropyl)trimethoxysilane and 84.3 wt % of trifluorotoluene were used to prepare a composition for forming a fingerprint-resistant layer. (below, AF-2)

Preparation Example 5

A composition for forming a fingerprint-resistant layer was prepared in the same manner as in Preparation Example 3. except for aminoethyl(aminopropyl)trimethoxysilane. That is, 15 wt % of perfluoropolyethylene modified silane 1 and 85 wt % of trifluorotoluene were used. (below, AF-3).

Examples 1 to 4

The resin composition having the composition shown in Table 1 below was used to form a hard coating layer on the upper and lower surfaces of the support substrate, and then the compositions for forming an fingerprint-resistant layer of Preparation Examples 4 and 5 were coated on the upper surface to produce a fingerprint-resistant layer (AF layer).

In detail, the second resin composition for forming a lower coating layer described in Table 1 below was coated onto one surface of a PET substrate having a size of 15 cm×20 cm and a thickness of 50 μm, and then photocuring was performed using a UV lamp (irradiation dose: 400 mJ/cm²) to produce a lower hard coating layer (below, HC 2 layer). In addition, the first resin composition for forming an upper coating layer described in Table 2 below was coated onto on the opposite side of the PET substrate on which the lower coating layer was formed, and then photocuring was performed using a UV lamp (irradiation dose: 400 mJ/cm²) to produce an upper hard coating layer (below, HC 1 layer). Thereafter, the resin composition for forming a fingerprint-resistant layer of Preparation Example 4 or 5 was coated onto on the upper coating layer, and then photocuring was performed using a UV lamp (irradiation dose: 400 mJ/cm²) to produce a fingerprint-resistant layer (AF layer). According to the above procedure, an optical laminate having a total thickness of 250.01 to 251 μm was prepared.

Comparative Example 1

As described in Table 1 below, the resin composition prepared in Preparation Examples 1 and 2 was coated onto both surfaces of a PET substrate having a size of 15 cm×20 cm and a thickness of 50 μm, and then photocuring was performed using a UV lamp (irradiation dose: 200 mJ/cm²) for 10 seconds to produce the upper and lower hard coating layers on the both surfaces of the substrate. In addition, the composition AF-3 of Preparation Example 5 was coated onto the upper coating layer to form an AF layer.

Comparative Examples 2 and 3

A hard coat film was prepared in the same manner as in Example 1, except for using only the resin composition for forming the upper and lower coating layer as shown in Table 1 below.

TABLE 1

|  | Example 1 | Example 2 | Example 3 | Example 4 | Comparative Example 1 | Comparative Example 2 | Comparative Example 3 |
|---|---|---|---|---|---|---|---|
| First resin composition for forming fingerprint-resistant layer | Preparative Example 3 (AF-1) | Preparative Example 3 (AF-1) | Preparative Example 3 (AF-1) | Preparative Example 4 (AF-2) | Preparative Example 5 (AF-3) | — | — |
| First resin composition for forming upper coating layer | Preparative Example 1 (H/C-1) | Preparative Example 1 (H/C-1) | Preparative Example 1 (H/C-1) | Preparative Example 1 (H/C-1) | Preparative Example 1 (H/C-1) | Preparative Example 1 (H/C-1) | Preparative Example 2 (H/C-2) |
| Second resin composition for forming lower coating layer | Preparative Example 2 (H/C-1) | Preparative Example 2 (H/C-1) | Preparative Example 2 (H/C-1) | Preparative Example 2 (H/C-1) | Preparative Example 2 (H/C-1) | Preparative Example 2 (H/C-1) | Preparative Example 2 (H/C-1) |

Experimental Example

The physical properties of the optical laminates produced in Examples 1 to 4 and the general hard coat film produced in Comparative Examples 1 to 3 were measured by the following method, and the results are shown in Tables 2 and 3 below.

1) Pencil Hardness

The hardness without scratches was confirmed after moving the pencil back and forth five times at under a load of 1.0 kg using a pencil hardness tester in accordance with standard JIS K5400.

2) Adhesion

The adhesion (adhesive strength) between the fingerprint-resistant layer and the upper coating layer (AF-H/C1 layer) was evaluated by a cross-hatch test method.

A cross-cut test was performed in accordance with the ASTM D3002/D3359 standard which is a cross-cut test standard. Specifically, the specimens were cut in 11 rows with a knife in the horizontal and vertical directions at intervals of 1 mm, to form 100 square grids each having 1 mm in width and length. Then, when Nichiban CT-24 adhesive tape was adhered to the cut surface and then removed, the state of the surfaces detaching together was measured and evaluated according to the following criteria.

<Cross-Hatch Adhesive Strength Evaluation Criteria>

5B: When detached surface dose not exist

4B: When the detached surface is within 5% of the total area

3B: When the detached surface is within 5 to 15% of the total area

2B: When the detached surface is within 15 to 35% of the total area

1B: When the detached surface is within 35 to 65% of the total area

0B: When almost all detach

3) Water contact angle

After coating, the contact angle of the coated surface was measured using a contact angle measuring device. The size of one water droplet at the time of contact angle measurement was set to 3 μl, and in order to confirm the uniformity of the coating, the contact angle at 5 points per coated sample was measured and averaged.

4) Fingerprint Wiping-Off Property

Fingerprints were adhered to the surface of the optical laminate prepared above, and the surface was wiped with a clean wiper and evaluated according to the following criteria.

◎: When completely wiped within 3 times

○: Wen completely wiped within 10 times x: When not wiped

5) Scratch Resistance

After rubbing the surface back and forth 1,000 times with a steel wool (#0000) under a load of 500 g, it was visually confirmed whether or not the coating film was worn (scratch, haze), and when no deformation occurred, it was determined as "O.K.", and when abrasion or deformation occurred, it was determined as "N.G.".

TABLE 2

|  |  | Example 1 | Example 2 | Example 3 | Example 4 |
|---|---|---|---|---|---|
| Composition of structure | AF layer | AF-1 | AF-1 | AF-1 | AF-2 |
|  | H/C 1 layer | H/C-1 | H/C-1 | H/C-1 | H/C-1 |
|  | Substrate | PET | PET | PET | PET |
|  | H/C 2 layer | H/C-1 | H/C-1 | H/C-1 | H/C-1 |
| Thickness | AF layer | 10 nm | 15 nm | 1 nm | 15 nm |
|  | H/C 1 layer | 100 μm | 100 μm | 100 μm | 100 μm |
|  | H/C 2 layer | 100 μm | 100 μm | 100 μm | 100 μm |
| Adhesion (AF-H/C1 interlayer) |  | 5B | 5B | 5B | 5B |
| Pencil hardness (750 kgf) |  | 8H | 8H | 8H | 8H |
| Water contact angle |  | 115° | 115° | 115° | 114° |
| Fingerprint wiping-off property |  | ◎ | ◎ | ◎ | ◎ |
| Scratch resistance |  | O.K. | O.K. | O.K. | O.K. |

Note)
Substrate thickness: 50 μm
H/C 1 layer: upper coating layer
H/C 2 layer: lower coating layer

TABLE 3

|  |  | Comparative Example 1 | Comparative Example 2 | Comparative Example 3 |
|---|---|---|---|---|
| Composition of structure | AF layer | AF-3 | — | — |
|  | H/C 1 layer | H/C-1 | H/C-1 | H/C-2 |
|  | Substrate | PET | PET | PET |
|  | H/C 2 layer | H/C-1 | H/C-1 | H/C-1 |
| Thickness | AF layer | 15 nm | — | — |
|  | H/C 1 layer | 100 μm | 100 μm | 100 μm |
|  | H/C 2 layer | 100 μm | 100 μm | 100 μm |

TABLE 3-continued

|  | Comparative Example 1 | Comparative Example 2 | Comparative Example 3 |
|---|---|---|---|
| Adhesion (AF-H/C1 interlayer) | 0B | — | — |
| Pencil hardness (750 kgf) | 8H | 8H | 8H |
| Water contact angle | 114° | 60° | 111° |
| Fingerprint wiping-off property | ◎ | × | ○ |
| Scratch resistance | N.G. | O.K. | N.G. |

Note)
Substrate thickness: 50 μm
H/C 1 layer: upper coating layer
H/C 2 layer: lower coating layer As a result of the experiment, the optical laminates of Examples 1 to 4 included a hard coating layer having a specific composition (i.e., an upper coating layer and a lower coating layer) on both surfaces of the substrate, and particularly included an fingerprint-resistant layer having a specific composition on the upper coating layer, and thereby, exhibited improved fingerprint wiping-off property and scratch resistance. Specifically, since Examples 1 to 4 include the composition of organosilane that can induce adhesion with the binder resin to the fingerprint-resistant layer, the adhesive strength and scratch resistance can be improved. In addition, Examples 1 to 4 showed hardness and water contact angle equivalent to or higher than the conventional ones.

On the other hand, Comparative Example 1 includes the fingerprint-resistant layer but does not include the composition of the present disclosure, the adhesion of the fingerprint-resistant layer and the upper coating layer was reduced, and scratch resistance was poor. In addition, Comparative Examples 2 to 3 do not include a fingerprint-resistant layer, the water contact angle, fingerprint wiping-off property and scratch resistance were generally poor compared to Examples 1 to 4. Further, in Comparative Example 3, a hard coating layer was formed using an organosilane compound, but it was not formed by the configuration of the fingerprint-resistant layer formed separately from the upper and lower hard coating layer as in the present disclosure, the adhesive strength and scratch resistance was poor.

The invention claimed is:

1. An optical laminate comprising:
a support substrate layer having a thickness of 30 to 100 μm;
a hard coating layer disposed on both surfaces of the support substrate layer and having a thickness of 60 to 100 μm; and
a fingerprint-resistant layer disposed on at least one surface of the hard coating layer and having a thickness of 10 nm to 5 μm,
wherein the fingerprint-resistant layer includes a cured product of a composition comprising a binder resin and an organic silane compound and wherein the organic silane compound has at least one organic functional group selected from the group consisting of an epoxy group, a (meth)acryloxy group, a mercapto group and an amino group, and
wherein the hard coating layer includes an epoxy polysiloxane of Chemical Formula 1, $$(R^1SiO_{3/2})_a(R^2SiO_{3/2})_b(OR)_c \quad \text{[Chemical Formula 1]}$$

in the Chemical Formula 1,
$R^1$ is a glycidyl group represented by Chemical Formula 2; or glycidoxypropyl group,

[Chemical Formula 2]

in the Chemical Formula 2,
Ra is selected from the group consisting of a substituted or unsubstituted alkylene group having 1 to 6 carbon atoms, a substituted or unsubstituted alkenylene group having 2 to 20 carbon atoms, a substituted or unsubstituted alkynylene group having 2 to 20 carbon atoms, —Rb— CH=CH— COO-Rc-; -Rd-OCO— CH=CH—Re—, —RfORg-, —RhCOORi-, and -RjO-CORk-,
Rb to Rk are each independently a single bond, or a substituted or unsubstituted alkylene group having 1 to 6 carbon atoms,
$R^2$ is a substituted or unsubstituted alkyl group having 1 to 20 carbon atoms, a substituted or unsubstituted cycloalkyl group having 3 to 20 carbon atoms, a substituted or unsubstituted alkenyl group having 2 to 20 carbon atoms, a substituted or unsubstituted alkynyl group having 2 to 20 carbon atoms, a substituted or unsubstituted aryl group having 6 to 20 carbon atoms, a substituted or unsubstituted arylalkyl group having 7 to 20 carbon atoms, a substituted or unsubstituted alkylaryl group having 7 to 20 carbon atoms, an epoxy group or a hydrogen atom,
R is a hydrogen atom or an alkyl group having 1 to 20 carbon atoms, and
a, b, and c are each
0<a<1, 0≤b<1 and 0<c<1.

2. The optical laminate of claim 1, wherein the organic silane compound is contained in an amount of 0.1 to 5.0% by weight based on the total weight of the composition.

3. The optical laminate of claim 1, wherein the binder resin is at least one selected from the group consisting of a perfluoro polyether compound and a fluoro modified silicone compound.

4. The optical laminate of claim 1, wherein in the Chemical Formula 1, a, b and c satisfy 0.7≤a/(a+b)≤1, 0≤b<0.5 and 0<c<0.5.

5. The optical laminate of claim 1, wherein in the Chemical Formula 2, Ra is a methylene group.

6. The optical laminate of claim 1, wherein in the Chemical Formula 1, the $R^2$ is substituted with one or more substituents selected from the group consisting of an alkyl group having 1 to 12 carbon atoms, a cycloalkyl group having 3 to 12 carbon atoms, an alkenyl group having 2 to 12 carbon atoms, a hydroxyl group, an alkoxy group having 1 to 12 carbon atoms, an amino group, an acryl group, a methacryl group, a halogen group, a mercapto group, an ether group, an ester group, an acetyl group, a formyl group, a carboxyl group, a nitro group, a sulfonyl group, an urethane group, an epoxy group, an oxetane group and a phenyl group.

7. The optical laminate of claim 1, wherein the hard coating layer further includes an elastomeric polymer.

8. The optical laminate of claim 7, wherein the elastomeric polymer includes at least one selected from the group consisting of alkanediol having 1 to 20 carbon atoms, polyolefin polyol, polyester polyol, polycaprolactone polyol, polyether polyol and polycarbonate polyol.

9. The optical laminate of claim 1, wherein the hard coating layer further comprises a reactive monomer including at least one functional group capable of crosslinking with the epoxy polysiloxane of the Chemical Formula 1.

10. The optical laminate of claim 9, wherein the reactive monomer includes any one selected from the group consisting of bisphenol A diglycidyl ether, 4-vinylcyclohexene dioxide, cyclohexene vinyl monooxide, (3,4-epoxycyclohexyl)methyl 3,4-epoxycyclohexylcarboxylate, 3,4-epoxycyclohexylmethyl methacrylate, 3,4-epoxycyclohexanecarboxylate, 2-(3,4-epoxycyclohexyl)-1,3-dioxolane, bis(3,4-epoxycyclohexylmethyl)adipate, p-butyl phenol glycidyl ether, butyl glycidyl ether, cresyl glycidyl ether, allyl glycidyl ether, phenyl glycidyl ether, diglycidyl ether, butanediol diglycidyl ether, limonene dioxide, vinylcyclohexene dioxide, diethylene glycol diglycidyl ether, 3-methyloxetane, 2-methyloxetane, 3-oxetanol, 2-methyleneoxetane, 3-methyl-3-hydroxymethyloxetane, 3-ethyl-3-hydroxymethyloxetane, 3,3-oxetanedimethane thiol, 2-ethylhexyl oxetane, 4-(3-methyloxetane-3-yl)benzonitrile, N-(2,2-dimethylpropyl)-3-methyl-3-oxetanemethanamine, N-(1,2-dimethylbutyl)-3-methyl-3-oxetanemethanamine, xylylene bisoxetane, 3-ethyl-3[{(3-ethyloxetane-3-yl)methoxy}methyl]oxetane, (3-ethyloxetane-3-yl)methyl (meth)acrylate, and 4-[(3-ethyloxetane-3-yl)methoxy]butan-1-ol, or a mixture of two or more thereof.

11. The optical laminate of claim 1, wherein the support substrate layer includes a plastic resin and wherein the plastic resin includes one or more resins selected from the group consisting of polyester-based resin, cellulose-based resin, polycarbonate-based resin, acrylic-based resin, styrene-based resin, polyolefin-based resin, polyimide-based resin, polyether sulfone-based resin and sulfone-based resin.

12. A polarizing plate comprising the optical laminate of claim 1.

13. A display device comprising the optical laminate of claim 1.

14. A cover window of a display device comprising the optical laminate of claim 1.

\* \* \* \* \*